United States Patent [19]
Mangold et al.

[11] Patent Number: 4,525,746
[45] Date of Patent: Jun. 25, 1985

[54] TELEVISION SET

[75] Inventors: Hans Mangold, Fürth; Hans Eckert, Nuremburg; Jürgen Schönborn, Fürth-Vach, all of Fed. Rep. of Germany

[73] Assignee: Grundig E.M.V., Fürth, Fed. Rep. of Germany

[21] Appl. No.: 458,918

[22] Filed: Jan. 18, 1983

[30] Foreign Application Priority Data

Jan. 23, 1982 [DE] Fed. Rep. of Germany ....... 3202046

[51] Int. Cl.³ ............................................... H04N 5/64
[52] U.S. Cl. ..................................................... 358/254
[58] Field of Search ....................... D14/77, 79, 83, 80, D14/81, 82; 358/254, 248, 230, 240, 241, 242; 340/700, 323, 784, 782, 752, 766; 455/349, 348; 339/17 C, 17 R, 17 LC, 31 R, 43, 4; 294/142

[56] References Cited

U.S. PATENT DOCUMENTS

| D. 716,492 | 1/1956 | Barofsky | D14/83 |
| 2,943,276 | 7/1960 | Ford | 294/142 |
| 3,103,398 | 9/1983 | Phelps | 339/4 |
| 4,173,024 | 10/1979 | Miller | 358/255 |
| 4,438,458 | 3/1984 | Munscher | 358/254 |

FOREIGN PATENT DOCUMENTS

| 222804 | 10/1957 | Australia . | |
| 2414021 | 10/1975 | Fed. Rep. of Germany | 339/4 |
| 1180110 | 6/1959 | France | 358/254 |
| 518384 | 3/1955 | Italy . | |
| 55-41061 | 3/1980 | Japan | 358/254 |

Primary Examiner—John C. Martin
Assistant Examiner—Victor R. Kostak
Attorney, Agent, or Firm—Kane, Dalsimer, Kane, Sullivan & Kurucz

[57] ABSTRACT

The television set which includes a separate modular video screen and a separate receiver both of a generally flat configuration with the video screen pluggable (connectable) at a plurality of outlets in the receiver wherein it is generally perpendicular to the receiver or in tandem therewith. The video screen being capable of fitting into different positions with respect to the receiver due to the connection therebetween.

15 Claims, 7 Drawing Figures

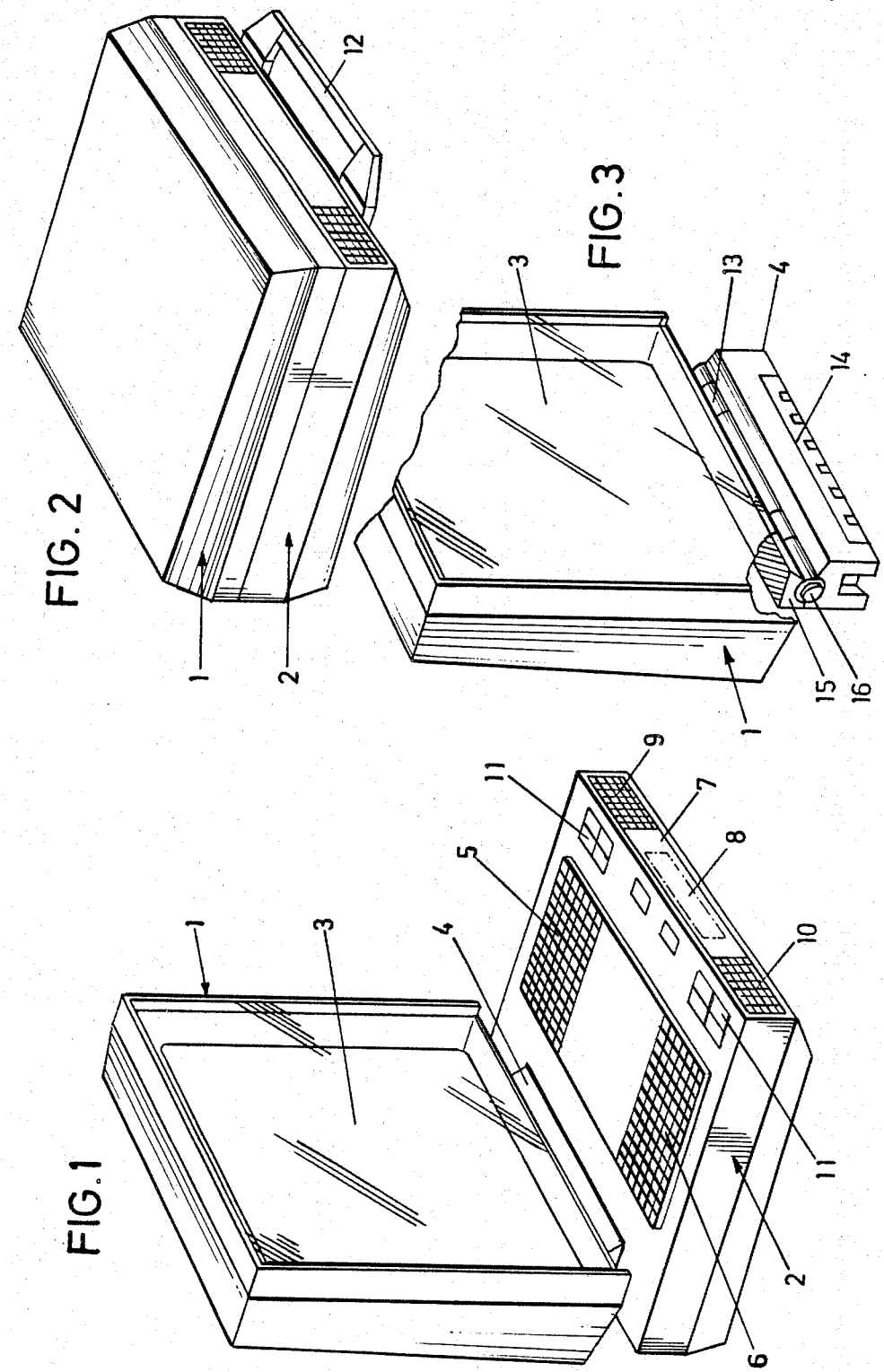

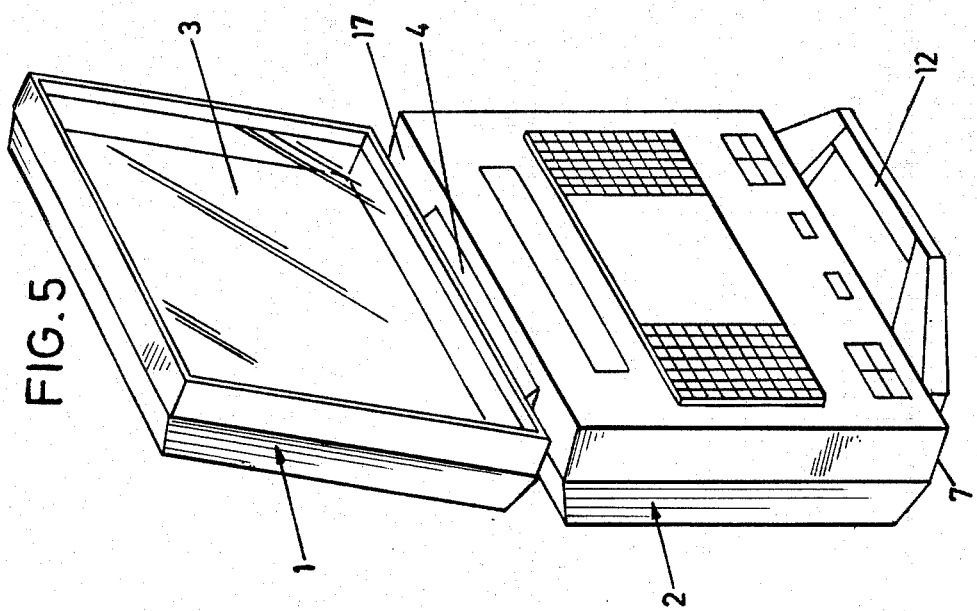
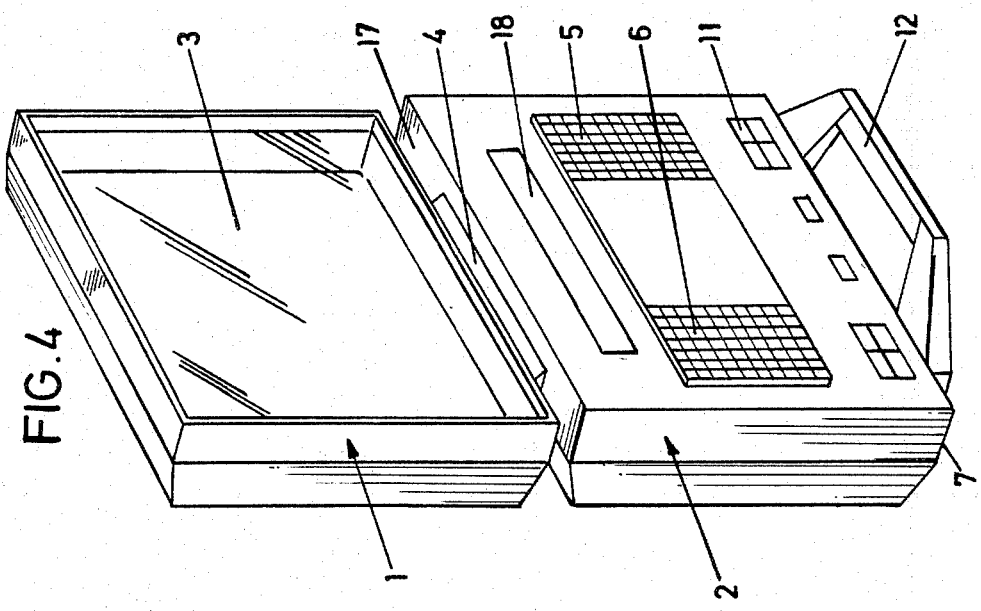

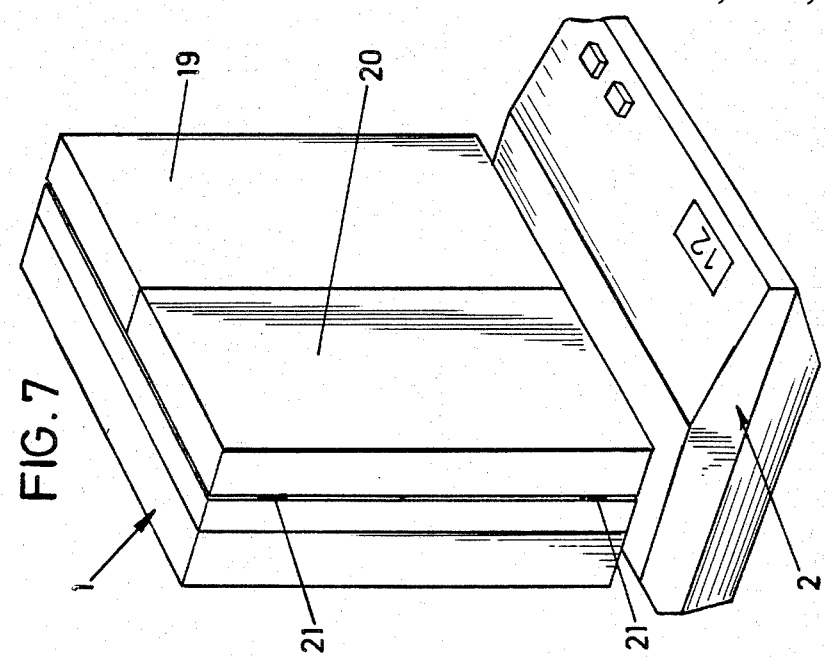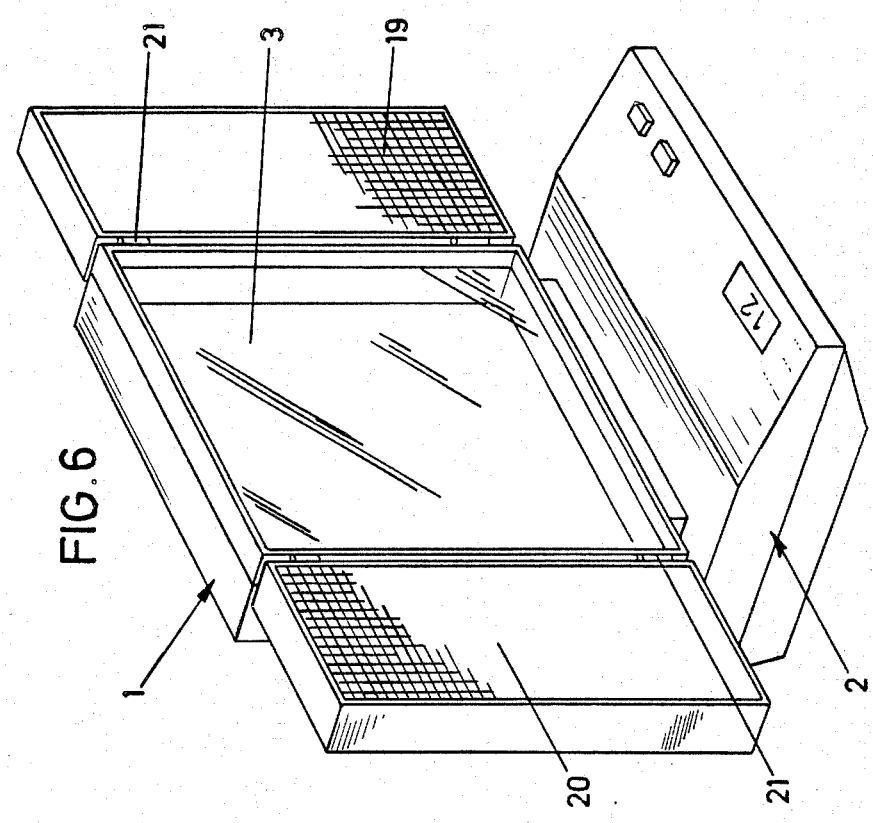

TELEVISION SET

FIELD OF THE INVENTION

The present invention relates to a television set, particularly one that is ultimately assembled from a plurality of detachable parts.

BACKGROUND OF THE INVENTION

In traditional or conventional television sets, the size and handiness of the sets is principally determined by the size of the picture tube. Heretofore pictures tubes had considerable depth which in certain applications, particularly those intended to be of a portable nature, rendered them cumbersome especially in the larger sizes since as the size of the video screen face increased so did its width. This has always posed a problem in reducing the overall dimensions of the television set. However, present day technology to reduce screen width is now available. Substantially reduced video screens or "flat video screens" now permit a considerable reduction of the set depth and allow for versatility in design of television sets not heretofore possible. In this regard, in commonly assigned U.S. patent application Ser. No. 439,229 filed Nov. 4, 1982 entitled "Television Set", there is disclosed television sets which comprise modular units which may be assembled in different ways for the user's convenience. The present invention is to improve yet further upon such television sets.

SUMMARY OF THE INVENTION

It is therefore a principal object of the present invention to provide for a flat video screen television set which is functional and versatile in nature than that heretofore realized and accommodates yet further diverse usage under a variety of circumstances.

In this regard the present invention provides for a television set which is assembled out of a plurality of modular units operationally coupled together in a variety of ways to suit the viewer needs. A flat video screen is provided in modular form and adapted to be detachably coupled to a audio/video receiver module in a plurality of places by way of perhaps a "plug-in-bar" on the screen frame which can be plugged into different receiving portions of the receiver so as to communicate the video signals therebetween.

In this regard, the receiver portion is generally flat and rectangular in shape and is provided with two bar receiving outlets positioned so as to allow the screen to be positioned perpendicularly with respect to the flat portion of the receiver resulting in a free standing set, or in tandem. The plug-in-bar may be provided with a pivot bar to allow the video screen to pivot up and down to the extend desired. The fully down position is essentially a carrying position where the screen abuts the receiver thereby protected against damage.

In another embodiment, pivotable speakers are maintainable on the screen and movable between a first or closed position protecting the screen against unnecessary damage, and a second position where the speakers are open for operation, approximately positioned in the same plane as the video screen. Note that the speakers may alternatively be smaller auxiliary video screens if so desired.

Further, a slidable handle is also provided and functions as both a carrying handle and a platform for the television set.

The present invention thus has the advantage of versatility since the telvision set is being manufactured without the knowledge beforehand in what manner it is to be used. It allows for interchangeability due to its modular nature and plug in feature with a few manipulations: operating as a standing set; or as a hanging wall set; or with movable speakers; all of which have an adjustable screen position.

BRIEF DESCRIPTION OF THE DRAWINGS

Thus by the present invention its objects, advantages and others will be readily realized, the description of which should be taken in conjunction with the drawings wherein:

FIG. 1 is a perspective view of the television set shown with its video screen vertically mounted on the horizontally disposed receiver portion, incorporating the teachings of the present invention;

FIG. 2 is a perspective view of the television set shown in FIG. 1, showing the video screen portion folded onto receiver portion;

FIG. 3 is a perspective partially sectional view of the video screen portion of the invention shown detached from the receiver portion;

FIG. 4 is a perspective view of the television set showing the screen and receiver portions arranged in tandem and supported by its carrying handle, incorporating the teachings of the present invention;

FIG. 5 is a perspective view of the television set similar to FIG. 4 with however the video portion slightly inclined;

FIG. 6 is a perspective view of a television set similar to FIG. 1 with however loudspeakers movably attached to the video screen portion; and FIG. 7 is a perspective view of the television set shown in FIG. 6 with however the loudspeakers are pivoted in front of the video screen portion.

DETAILED DESCRIPTION OF THE PREFERRED EMBODIMENT

With reference now more particularly to the drawings, in FIG. 1 there is illustrated a television set which includes a video screen portion 1 and a receiver portion 2. Both portions 1 and 2 have a rectangular box shape and are of about uniform width and height allowing them to be super positioned with respect to each other. The video portion 1 contains a flat video screen 3 which is mounted in a frame with appropriate filter panes etc., as desired.

The video portion 1 is detachably connected along its lower longitudinal side with the receiver portion 2 at a receiving outlet or opening on either the upper side of the receiver portion 2 as shown in FIGS. 1, 2, 6 and 7 or on its rear side 17 as shown in FIGS. 4 and 5. In this regard and as shown in FIG. 3, a plug-in-bar or multiway connector 4 is provided integrally or mechanically coupled to the video portion 1 at portion 15 and includes a plurality of electrical contacts on a contact part 14 thereon so as to effectively couple the video portion 1 to the receiver portion 2 to allow the passing of signals therebetween. Accordingly, both the receiving outlets for the connector 4 would have corresponding electrical connectors for detachable coupling with those on the connector 4. Once fully inserted, the tolerances are such that the portions are securely maintained together, however, the two portions may be mechanically locked together by way of a locking connection (not shown) if so desired.

As can be seen from FIG. 3, the connector 4 with which the video portion 1 is mounted on the receiver portion 2 is provided with a hinge 13. The hinge 13 connects the contact part 14 with the upper part 15 of connector 4. The hinge 13 is so designed that different lockable angle positions for the video portion 1 are possible with respect to the receiver portion 2. The locked position of the hinge 13 can be released by pushing a push button release 16 which may be of a standard variety, which is mounted in the longitudinal axis of the hinge.

Provided on the upper side of the receiving portion 2 are two built in loudspeakers 5 and 6 symmetrically disposed thereon, which may contain a plurality of audio speakers. An opening 8 for a video cassette may be conveniently provided on the small front side 7 of the receiver portion 2, insofar as the television set is also simultaneously equipped with or coupled to a video recorder or player.

Adjacent opening 8 may be provided additional speakers 9 and 10 such as tweeters etc., which may be built in at both sides of front face 7 on either side of opening 8, if so desired. Essential control elements 11 of the set are provided on the front longitudinal area of the upper side of the receiver portion 2 which provide volume, channel selection etc. While a small number of control keys are shown as in the case of a remote control device, in a manual device additional control keys could be added as needed.

With reference now to FIG. 2 there is illustrated a portable television set formed by the folding together of the receiving portion 2 and the video portion 1. This results in protecting the video screen 3 against damage during transport while also making the set readily portable. A carrying handle 12 in this regard is provided allowing for easy carrying of the set. The carrying handle 12 may also be folded out or pulled out from the receiver portion 2 to provide platform (see FIG. 4) for the set and would not be otherwise visible when not in use by perhaps returning to a recess in the receiver portion 2. In the folded position, the video and receiver portions may be locked together by way of a clasp etc., or any other means suitable for purpose.

With particular reference now to FIG. 4 which shows the video portion 1 plugged into the opening on the small rear side 17 of the receiver portion 2 so as to result in a flat configuration of the television set, while the small front side 7 is positioned pointing downward. When connected in this manner, the television set may be suspended on any given vertical wall like a picture. For this purpose, devices for mounting or suspending of the set may be provided, on the bottom or rear side, preferably of the receiver portion 2. The unused opening on the cover face of the receiver portion 2 may be covered with cover plate 18 to give the face a smooth, elegant look.

Rather than hanging the set, the design of it can be modified to allow for it to be free standing along its longitudinal axis as illustrated in FIG. 4. More particularly, the base side of the device can be substantially increased by perhaps enlarging the small front side 7 and arranging the carrying handle 12 so that it may be pulled out of the receiver portion 2 and pivoted into position. The handle 12 can then be pivoted to form a base or platform for the television set as shown so as to allow it to be free standing.

Turning now to FIG. 5 there is shown a particular advantage of the tiltable video part 1. The video screen 3 which is built into the video portion 1 can be tilted into a position which is most favorable for the user. In such a situation, the enlarging of the base face adjacent the carrying handle 12 would be particularly necessary for obvious reasons.

With reference now to the television set shown in FIG. 6, the video portion 1 is vertically mounted on receiver portion part 2. Rectangular boxes or support fixtures 19 and 20 are provided for perhaps audio speakers at both sides of the video portion 1 by means of connecting hinges 21 in such a manner that the video screen is completely covered, after pivoting the boxes 19 and 20 towards the video screen 3 as can be seen in FIG. 7. The connector hinges of the boxes 19 and 20 are so designed that the electrical connection to the boxes is maintained over the connector hinges 21 so as to allow for electrical communication to pass thereover.

Note that as an alternative to the audio speakers in boxes 19 and 20, the receiver portion 2 may include the speakers therein as shown in FIGS. 1, 3, 4 and 5 with instead two flat video screens supported by boxes 19 and 20. These smaller video screens can be considered to be auxiliary video screens with respect to a "main" video screen 3 and serve to receive simultaneously different television programs, via appropriate video hardware.

Note further that in all of the described television sets the receiving portion may readily include standard devices which permit the use of supplementary components which may be necessary for the desired features (i.e., video recorders etc.) video screen text; cable television; and for adapting the set to different color television standards.

Thus by the present invention, its objects, advantages and others are readily realized and although preferred embodiments have been disclosed and described in detail herein, its scope should not be limited thereby, rather its scope should be determined by that of the appended claims.

What is claimed is:

1. A television set comprising:
   a video portion including a video screen which is self-contained in a first housing;
   a receiver portion which is self-contained in a second housing, said receiver portion capable of receiving and conveying audio and video signals;
   detachable connecting means coupled between said video portion and receiver portion so as to permit video or electrical signals to pass from the receiver portion to the video portion and wherein the decoupling of the connecting means from one of said portions allows for the separation of the respective housings;
   said connecting means including hinge means capable of allowing the video portion to pivot up and down with respect to the receiver portion; and
   said receiver portion includes handle means capable of providing a base on which to support the set while in addition facilitating the carrying of the set.

2. The television set in accordance with claim 1 wherein the video portion is capable of pivoting from an open position at which time the video screen is viewable, to a closed position at which time the video screen is substantially flush with the receiver portion.

3. The television set in accordance with claims 1 or 2 wherein said hinge means comprises an electrically connectable connector bar coupled between said video portion and receiver portion allowing said portions to pivot with respect to each other.

4. The television set in accordance with claim 3 wherein said hinge means includes locking means capable of maintaining the video portion and receiver portion stationary at a plurality of angular positions with respect to each other.

5. The television set in accordance with claim 4 wherein said locking means includes a push button means capable of releasably locking said portions at said angular positions with respect to each other.

6. The television set in accordance with claim 4 wherein said hinge means includes plug means coupled to said video screen portion; outlet means disposed on said receiver portion and includes at least two separate outlets positioned at different locations on the receiver portion, each outlet capable of receiving said plug means and providing a connection therebetween for passing signals.

7. The television set in accordance with claim 6 wherein said plug means includes a plug-in-bar and said outlets are sized to conform to said bar and to mechanically and electrically couple together.

8. The television set in accordance with claim 7 wherein said video screen portion includes a flat video screen maintained in said housing.

9. The television set in accordance with claim 1 wherein said video screen portion and said receiver portion are maintained in respective flat generally rectangular housings of relatively the same direction.

10. The television set in accordance with claim 6 wherein said receiver portion includes a cover face and a rear side generally perpendicular thereto, said face and side having positioned thereon respective outlets.

11. The television set in accordance with claims 1 or 2 which includes at least one support fixture coupled to the video screen portion by means of a connector hinge means; said connector hinge means being capable of allowing the support fixture to move from a position covering at least a part of the video screen.

12. The television set in accordance with claim 11 which includes at least two oppositely disposed support fixtures each coupled to respective sides of the video portion and being movable so as to completely cover the video screen.

13. The television set in accordance with claim 12 which includes connector hinge means electrically connecting the video portion to the support fixture.

14. The television set in accordance with claim 13 which includes audio speakers maintained in the support fixtures, said speakers being coupled so as to be capable of receiving audio signals from the receiving portion via the connector hinge means.

15. The television set in accordance with claim 1 which includes on the receiving part a cassette-video receiving portion.

* * * * *

UNITED STATES PATENT AND TRADEMARK OFFICE
CERTIFICATE OF CORRECTION

PATENT NO. : 4,525,746
DATED : June 25, 1985
INVENTOR(S) : Hans Mangold/Hans Eckert/Jürgen Schönborn It is certified that error appears in the above-identified patent and that said Letters Patent is hereby corrected as shown below:

Column 1, Line 13: change "pictures" to -picture-

Line 55: change "extend" to -extent-

Column 6, Line 2: change "directions" to -dimension-

Signed and Sealed this

Fifteenth Day of October 1985

[SEAL]

Attest:

DONALD J. QUIGG

Attesting Officer

Commissioner of Patents and
Trademarks—Designate